US012136020B2

(12) United States Patent
Zhou et al.

(10) Patent No.: US 12,136,020 B2
(45) Date of Patent: Nov. 5, 2024

(54) HIGH-FIDELITY ENTANGLED LINK GENERATION METHOD BASED ON QUANTUM TIME-SPACE

(71) Applicant: Shanghai Maritime University, Shanghai (CN)

(72) Inventors: Rigui Zhou, Shanghai (CN); Ruiqing Xu, Shanghai (CN); Yaochong Li, Shanghai (CN)

(73) Assignee: Shanghai Maritime University, Shanghai (CN)

( * ) Notice: Subject to any disclaimer, the term of this patent is extended or adjusted under 35 U.S.C. 154(b) by 23 days.

(21) Appl. No.: 18/329,952

(22) Filed: Jun. 6, 2023

(65) Prior Publication Data

US 2024/0338588 A1    Oct. 10, 2024

(30) Foreign Application Priority Data

Jul. 22, 2022   (CN) .......................... 202210871284.6

(51) Int. Cl.

| G06N 10/40 | (2022.01) |
| B82Y 20/00 | (2011.01) |
| G01B 9/02 | (2022.01) |
| H01Q 1/46 | (2006.01) |
| H04B 10/70 | (2013.01) |
| H04W 72/0453 | (2023.01) |

(52) U.S. Cl.
CPC .............. *G06N 10/40* (2022.01); *B82Y 20/00* (2013.01); *G01B 9/02048* (2013.01); *H01Q 1/46* (2013.01); *H04B 10/70* (2013.01); *H04W 72/0453* (2013.01)

(58) Field of Classification Search
CPC ........ G06N 10/40; G06N 10/00; B82Y 20/00; H04B 10/70; H04W 72/0453; H01Q 1/46; G01B 8/02
USPC .......... 380/256, 263, 277; 359/107; 713/153
See application file for complete search history.

(56) References Cited

U.S. PATENT DOCUMENTS

| 11,933,608 | B2 * | 3/2024 | Vacon ..................... H04B 10/70 |
| 2023/0128679 | A1 * | 4/2023 | Wang ..................... H04B 10/70 359/107 |
| 2023/0198634 | A1 * | 6/2023 | Orús Lacort .......... G06N 10/20 380/256 |
| 2023/0353982 | A1 * | 11/2023 | Routt ..................... G06N 3/045 |

* cited by examiner

*Primary Examiner* — Arnold M Kinkead
(74) *Attorney, Agent, or Firm* — Yanjun Ma; DeWitt LLP (57) ABSTRACT

The present invention discloses a high-fidelity entangled link generation method based on quantum time-space, the method comprising: directing, by a communication provider, a laser beam to a nonlinear crystal, thereby enabling probabilistically bursting out of a photon beam, and polarizing the photon beam to be in an entangled state; at an entanglement distribution stage, enabling entangled photons to traverse through quantum trajectories, and generating a distributed entangled photon state between a first communication node and a second communication node to construct an elementary entangled link; the first communication node or the second communication node is required to select the same measurement basis for m control qubits when m copies of entangled photon pairs from entanglement source are assumed to be distributed through quantum trajectories to communication nodes with the time interval τ, such that 2m memory qubits of two adjacent nodes may store m exactly the same distributed entangled states.

5 Claims, 5 Drawing Sheets

FIG. 5

HIGH-FIDELITY ENTANGLED LINK GENERATION METHOD BASED ON QUANTUM TIME-SPACE

BACKGROUND

In the standard quantum Shannon theory, although information to be transmitted is encoded with qubits, the transmission mode of an information carrier in a quantum channel still depends on the classical space-time. In view that the channel generally consists of a variety of noise processes, the qubits in the classical space-time are transmitted in a definite causal order of the variety of noise processes (such a transmission mode is generally referred to as a classical trajectory), such that the quantum coherence of the information carrier is greatly limited by channel loss. With the proposal of quantum space-time relying on the existing quantum gravity, it is found that qubits may simultaneously traverse the variety of noise processes presenting in different causal orders. A quantum channel formed by superposing different causal orders of noise processes is generally referred to as a quantum trajectory. Such a transmission mode can be used to effectively improve the transmission capability of classical information and quantum information in the quantum channel. M Caleffi et al. preliminarily studied how to apply the quantum trajectory to entanglement distribution in 2020, and found that a dynamic evolution of an information carrier traversing through multiple noise processes simultaneously in different causal orders can be converted into a process that the information carrier experiences a perfect noiseless channel with a certain probability and experiences a noise channel with a lower noise intensity than that of a classical space-time transmission trajectory with another probability. Since different entanglement distribution schemes are required in different communication network scenarios, the scheme proposed by M Caleffi et al only considered the scenario where communication nodes are utilized to prepare EPR entanglement sources and distribute one entanglement particle through quantum trajectory to its adjacent node, which cannot prove quantum trajectory has an absolute advantage in improving a channel performance during entanglement distribution compared with the classical trajectory. In addition, the study on information transmission over quantum trajectories is still at an early stage, and how to store and process distributed entanglement generated between communication nodes after entanglement distribution is also an urgent problem to be solved.

SUMMARY

The objective of the present invention is to overcome the defect of the existing methods, and provide a high-fidelity elementary entangled link generation method under a quantum space-time trajectory when the entanglement sources are prepared by a communication provider.

The present invention provides a method for generating a high-fidelity entangled link based on quantum time-space, involving the following detailed implementation steps, including: S101, directing, by a communication provider, a laser beam to a nonlinear crystal, thereby enabling probabilistically bursting out of a photon beam, polarizing the photon beam to be in an entangled state, and completing the preparation of a polarized entangled photon pair by the communication provider; S102, at an entanglement distribution stage, transmitting a first photon of an EPR entanglement source by the communication provider to the first communication node through a quantum trajectory, while transmitting a second photon to the second communication node through a quantum trajectory. By using a quantum switch to simulate each quantum trajectory, the distributed entangled photon state $\rho_{AB}^Q$ between the first communication node and the second communication node is represented in the following form:

$$\rho_{AB}^Q = \begin{cases} \Psi_1, \ p^2q^2 \\ \dfrac{(A_1^2 + B_1^2 + C_1^2)\Psi_1 + 2A_1B_1\Psi_2 + 2A_1C_1\Psi_3 + 2B_1C_1\Psi_4}{(1-D_1)^2}, (1-pq)^2 \\ \dfrac{A_1D_1\Psi_1 + B_1D_1\Psi_2 + C_1D_1\Psi_3}{D_1(1-D_1)}, 2pq(1-pq) \end{cases}$$

wherein the given $|\Psi_1\rangle_{AB}$ is the initial polarized entangled photon pair prepared by the communication provider, which is now distributed to the first communication node A and the second communication node B, $$|\Psi_1\rangle_{AB} = \frac{1}{\sqrt{2}}(|00\rangle + |11\rangle)_{AB};$$

$|00\rangle$ and $|11\rangle$ are ground states of two particles, and the ground states of the two particles are uniformly superposed to form a maximum entangled state of the two particles; $A_1=(1-p)(1-q)$, $B_1=(1-p)q$, $C_1=p(1-q)$, $D_1=pq$; $\Psi_i=|\Psi_i\rangle\langle\Psi_i|$, and $|\Psi_2\rangle=(|00\rangle+|11\rangle)/\sqrt{2}$, $|\Psi_3\rangle=(|01\rangle+|10\rangle)/\sqrt{2}$, $|\Psi_4\rangle=(|01\rangle-|10\rangle)/\sqrt{2}$, p, q are respectively error probabilities of a qubit flip channel and a quantum phase flip channel; and S103, after an elementary entangled link is generated between the two communication nodes, owing to the entangled state distributed between two communication nodes determined by control qubit, requiring the first communication node or the second communication node to select the same measurement basis for m control qubits $C_{Ai}$ or $C\_Bi$, i={1,2, . . . , m} when assuming m copies of entangled photon pairs from entanglement source are distributed through quantum trajectories to communication nodes with the time interval τ, such that 2m memory qubits (M_Ai, M_Bi) of two adjacent nodes may store m exactly the same distributed entangled states.

In an embodiment of the invention, the first communication node or the second communication node is equipped with a flying-matter qubit transducer for converting a photon polarization qubit distributed by an entangled photon source into a memory qubit of the communication node, so as to store and process the entangled state.

In an embodiment of the invention, the implementation of the flying-matter qubit transducer comprises that: the first communication node or the second communication node prepares in advance a set of entangled states of light qubits and memory qubits, and the polarization qubit of the entangled photon source can be teleported to the memory qubit of the communication node by performing Bell-basis measurement on itself and the light qubit of the communication node.

In an embodiment of the invention, the specific operations of step S103 comprise that:
(1) the two communication nodes first reach a consensus on the selection of measurement basis on control qubit; and after the measurement is completed, a heralded distributed entangled photon state $\rho_{AB}^Q$ is generated between the two communication nodes;

(2) entanglement pairs of a memory qubit and light qubits are respectively prepared in the first communication node and the second communication node in advance; and (3) Bell-basis measurement is performed on the light qubit of entangled photon state $\rho_{AB}^Q$ distributed to the first communication node and the light qubit of the node itself, so as to teleport the first light qubit of the entangled photon state $\rho_{AB}^Q$ to the memory qubit M_A1; similarly, after the second polarized qubit of the entangled photon state $\rho_{AB}^Q$ is teleported, the second polarized qubit is stored in memory qubit M_B1 in the second communication node. Therefore, the storage of the distributed entangled photon state between the communication nodes is implemented.

In an embodiment of the invention, the step of generating a high-fidelity distributed entangled state $\rho_{AB}^Q$ between the communication nodes comprises:

preprocessing an entangled mixed state $\rho_{AB}^Q$ in two sets of memory qubits (M_A1, M_B1) and (M_A2, M_B2), including a unilateral Pauli $\sigma_y$ operation and a bilateral rotation operation through which the entangled mixed state $\rho_{AB}^Q$ is converted into a Werner state $W_{AB}^Q$; performing entanglement purification operation on the two sets of memory qubits, including: using an EPR entangled state in the memory qubits (M_A1, M_B1) as a control state and using an EPR entangled state in the memory qubits (M_A2, M_B2) as a target state to perform a bilateral controlled non-gate operation; then performing Z-basis measurement on the target state; when the measurement result is 00 or 11, retaining the EPR entangled state in the memory qubits (M_A1, M_B1), otherwise discarding the EPR entangled state. After all the target states are measured, half of the control states are discarded, and the remaining control states are the result of the first purification of the entangled mixed state $\rho_{AB}^Q$; and storing the purified entangled state in the memory qubit (M_A1, M_B1); if the purified entangled state cannot reach a required threshold, continuing to perform entanglement purification operation on the first purified entangled state. Firstly, performing entanglement purification on the entangled mixed state $\rho_{AB}^Q$ in the two sets of memory qubits (M_A3, M_B3) and (M_A4, M_B4) to achieve a purified entangled state stored in the memory qubit (M_A3, M_B3); then, performing entanglement purification operation again on the entangled mixed state in the memory qubits (M_A1, M_B1) and (M_A3, M_B3), and storing a new purification result in the memory qubit (M_A1, M_B1), so as to complete secondary purification of $\rho_{AB}^Q$.

One embodiment of the present invention provides a high-fidelity entangled link generation method based on quantum space-time, and put forwards a method for entanglement distribution by introducing a quantum time-space concept to transmission of information carrier through a quantum channel when an entanglement source prepared by a communication provider is used. The method not only effectively suppresses the interference of noisy communication channels on an information carrier, but also provides an entanglement distribution technology with stronger noise resistance and higher robustness for a common communication network scenario, such as a satellite-based entanglement distribution network. Although the information transmission quality under a quantum trajectory is better than that under a classical trajectory, some noises still affect the generation quality of an entangled link between two nodes. Therefore, the present invention further designs a quantum memory model controlled by a control system. On the basis of the model, an entanglement purification method can be effectively used to improve the fidelity of an elementary entangled link under the quantum trajectory.

The present invention utilizes the quantum causality of quantum space-time. In terms of noise resistance, compared with the entanglement distribution scheme supported by the standard quantum Shannon theory, an entangled state distributed under the quantum trajectory may not be interfered by noise environment in a certain probability. Compared with an existing entanglement distribution scheme under quantum trajectory, the present invention has the following advantages:

1. The scheme of distributing both entangled particles of an entanglement source prepared by a communication provider through quantum trajectory can be efficiently applied in a satellite-based entanglement distribution network, providing guarantee for establishing an efficient wide-area and full-coverage quantum communication network.

2. The design of quantum memory model manipulated by the control system can effectively solve the storage and process problems of quantum information under the quantum trajectory.

3. The combination of the quantum trajectory and entanglement purification can improve the fidelity of the elementary entangled link between two communication nodes under the quantum trajectory, laying a foundation for subsequent establishment of a high-quality long-distance entangled link.

DETAILED DESCRIPTION OF THE EMBODIMENTS

Other advantages and effects of the invention can be readily appreciated by those skilled in the art by the following specific examples of embodiments of the invention, as disclosed herein. The present invention may also be implemented or applied by different specific embodiments, and the details in this specification may be modified or changed in various ways based on different views and applications without departing from the spirit of the present invention.

The drawings provided in the embodiments only illustrate the basic conceptions of the present invention in a schematic way. Therefore, the drawings only show the assemblies related to the present invention, but are not drawn according to the number, shapes and sizes of the assemblies in practical implementation. During practical implementation, the shapes, number and proportions of the assemblies may change according to requirements, and the layout of the assemblies may also be more complex.

Figure 1:
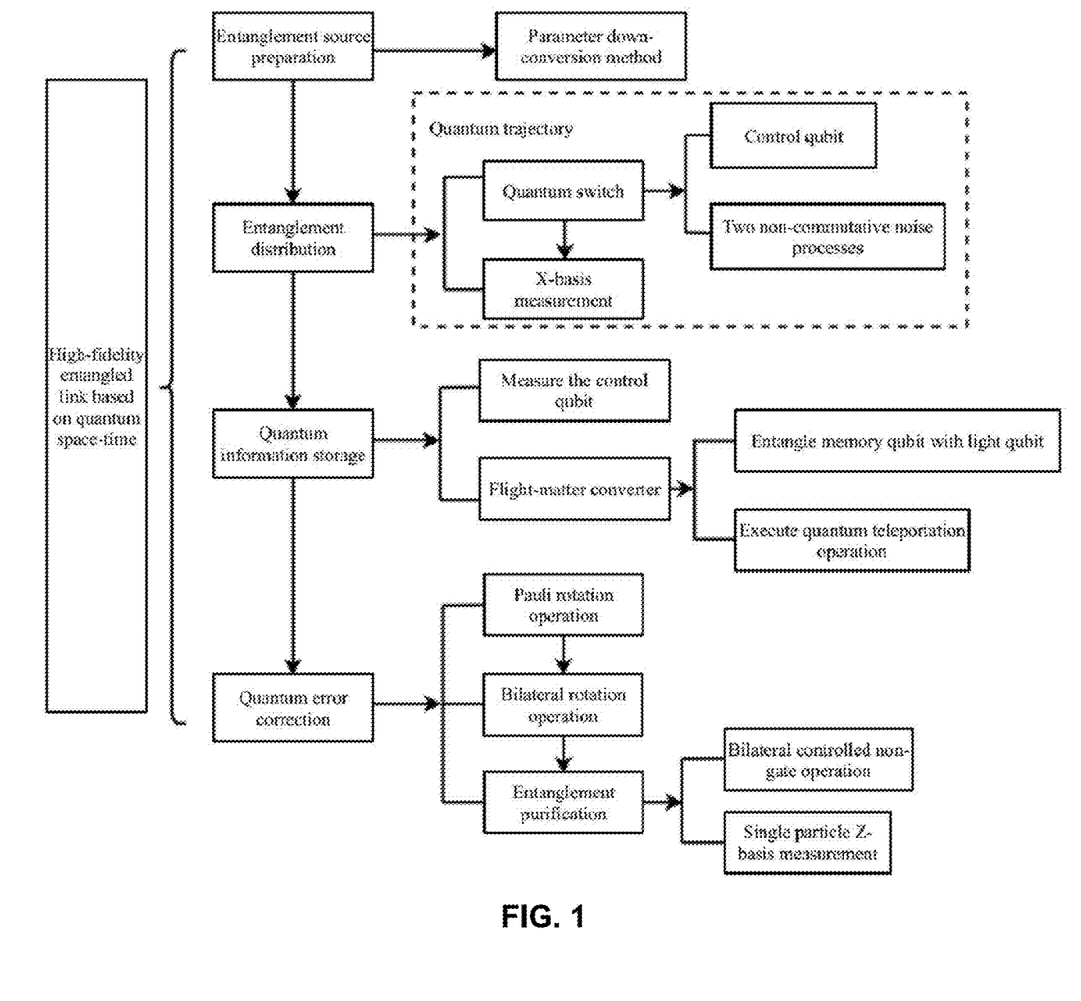
FIG. 1 is a technical route block diagram of a high-fidelity entangled link generated based on quantum space-time.

With reference to FIG. 1 which shows a technical route block diagram of a high-fidelity entangled link generated based on quantum space-time, the method comprises: entanglement source preparation, entanglement distribution, quantum information storage, and quantum error correction. An entanglement source may be prepared with a parameter down-conversion method. The quantum trajectory for entanglement distribution includes: a quantum switch which use a control qubit to control alternative causal orders of two non-commutative noise processes; and a measurement apparatus which performs an X-basis measurement on the control qubit at the output of the quantum switch to obtain a distributed entangled state between two nodes. In the quantum information storage process, multiple sets of control qubits located at two different nodes should be measured synchronously based on the same measurement basis, so as to generate a large number of the same distributed entangled states between the nodes; then, a flying-matter transducer is used to store flying qubits (light qubits) of the distributed entangled states in a matter qubit (memory qubit) by means of a quantum teleportation operation. The quantum error correction process includes: the distributed entangled state is converted into a Werner state by means of preprocessing operations, such as a Pauli rotation operation and a bilateral rotation operation; and then the Werner state benefiting from its easy operation is used to perform entanglement purification operation, which includes a bilateral controlled non-gate operation and a single-particle Z-basis measurement.

Figure 2:
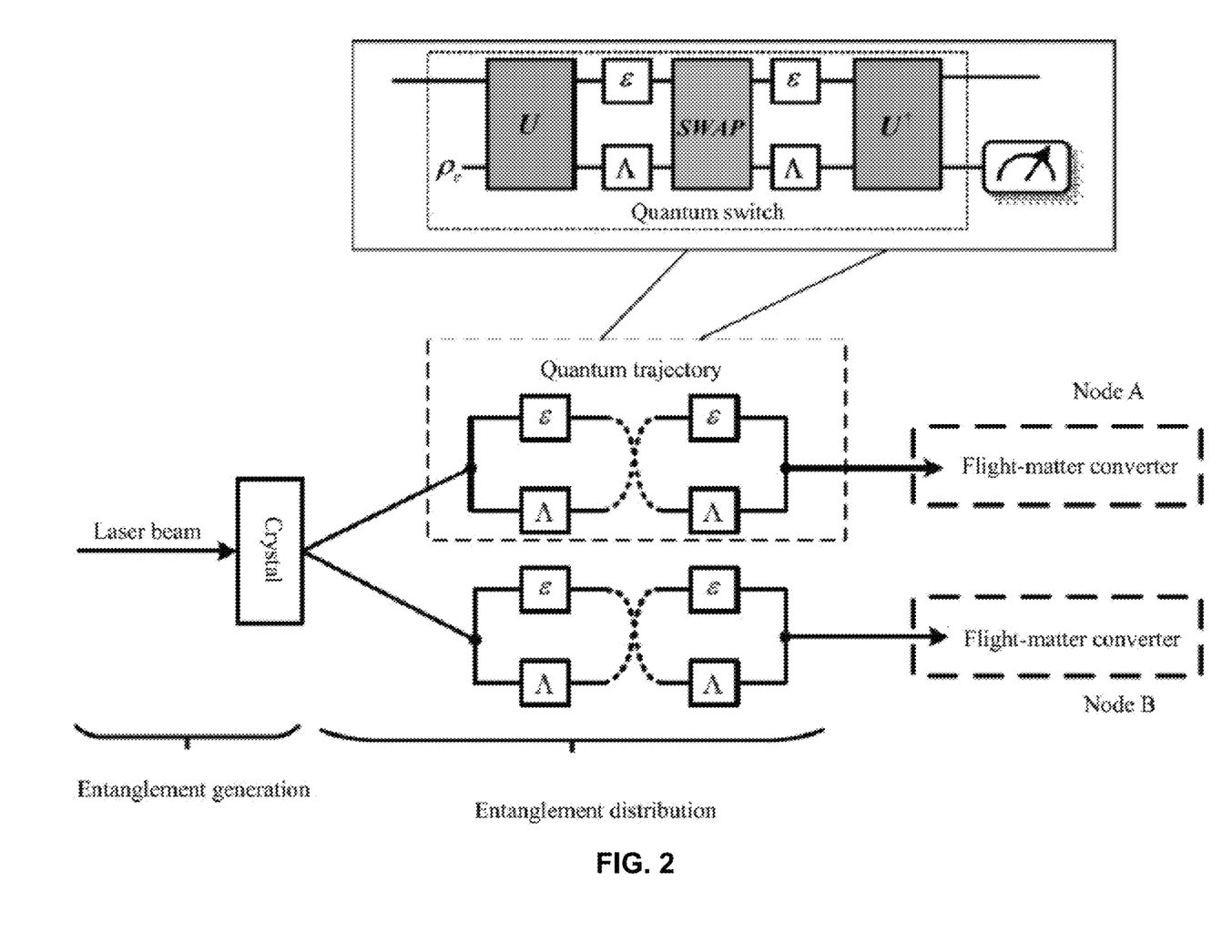
FIG. 2 is a schematic diagram of distributing each particle of an EPR entanglement source through a quantum trajectory.

The implementation principle of the present invention can be basically divided into the following steps;

FIG. 2 corresponds to the entanglement source preparation and entanglement distribution in FIG. 1. On the basis of common parameter down-conversion method, a communication provider directs a laser beam to a nonlinear crystal, such that a photon beam can be probabilistically burst out and polarized to be in an entangled state. Therefore, a polarized entangled photon pair prepared by the communication provider between a first communication node A and a second communication node B can be represented as:

$$|\Psi_1\rangle_{AB} = \frac{1}{\sqrt{2}}(|00\rangle + |11\rangle)_{AB};$$

During the entanglement distribution stage described in FIG. 2, the communication provider transmits the first photon of an EPR entanglement source through a quantum trajectory to the first communication node, while transmitting a second photon through a quantum trajectory to the second communication node. Each quantum trajectory is simulated using a quantum switch. The quantum switch can be physically configured to be the creation of a spatial qubit of a single photon under the action of a 50/50 beam splitter, and then a polarization qubit of the photon traverses either through a classical trajectory $\varepsilon(\bullet) \to \Lambda(\bullet)$ or a classical trajectory $\Lambda(\bullet) \to \varepsilon(\bullet)$ is determined by the spatial qubit either in a transmitted $|0\rangle$ state or a reflected $|1\rangle$ state. Therefore, when a spatial mode of the photon is in a single-particle superposed state $|+\rangle_c$, the polarization qubit of the photon simultaneously traverses through two classical trajectories $\varepsilon(\bullet) \to \Lambda(\bullet)$ and $\Lambda(\bullet) \to \varepsilon(\bullet)$, reflecting quantum causality of the quantum space-time. Theoretically, a quantum circuit diagram of quantum switch shown in FIG. 2 can be intuitively applied; that is, the operation U is first used to route whether a channel traversed by an input quantum state is $\varepsilon(\bullet)$ or $\Lambda(\bullet)$, and the specific routing path depends on the control qubit $\rho_c$; a swap gate SWAP is then used to implement the transmission of the input state in another noise channel; and the final operation U† recombines the possible transmission paths of the input state. Obviously, Kraus operator of quantum switch can be represented as $E_{ij} = F_j E_i \otimes |0\rangle\langle 0| + E_i F_j \otimes |1\rangle\langle 1|$; it is assumed that $E_0 = \sqrt{1-p}I$ and $E_1 = \sqrt{p}\sigma_x$ are Kraus operators of a qubit flip channel $\varepsilon(\bullet)$; $F_0 = \sqrt{1-q}I$ and $F_1 = \sqrt{q}\sigma_z$ are Kraus operators of a quantum phase flip channel $\Lambda(\bullet)$; and p and q are error probabilities of the qubit flip channel and the quantum phase flip channel respectively.

Under the actions of the above two independent quantum switches, if initial states of two control qubits are given in a superposed state $|++\rangle_c$, then a global quantum state $\rho_{\varepsilon,\Lambda,|++\rangle}$ related to the control qubit (the spatial mode of the photon) will be obtained at the output of quantum switches:

$$\begin{aligned}\rho_{\varepsilon,\Lambda,|++\rangle} &= \sum_{i,j,m,n} W_{ij} \otimes W_{mn}(\Psi_1 \otimes |++\rangle_c\langle ++|)W_{ij}^\dagger \otimes W_{mn}^\dagger \\ &= D_1^2 \Psi_1 \otimes |--\rangle_c\langle --| + \\ &\quad (A_1 D_1 \Psi_4 + B_1 D_1 \Psi_3 + C_1 D_1 \Psi_2) \otimes |+-\rangle_c\langle +-| + \\ &\quad (A_1 D_1 \Psi_4 + B_1 D_1 \Psi_3 + C_1 D_1 \Psi_2) \otimes |-+\rangle_c\langle -+| + \\ &\quad ((A_1^2 + B_1^2 + C_1^2)\Psi_1 + 2A_1 B_1 \Psi_2 + 2A_1 C_1 \Psi_3 + \\ &\quad 2B_1 C_1 \Psi_4) \otimes |++\rangle_c\langle ++| \end{aligned}$$

Wherein $A_1 = (1-p)(1-q)$, $B_1 = (1-p)q$, $C_1 = p(1-q)$, $D_1 = pq$; $\Psi = |\Psi_i\rangle\langle\Psi_i|$, and $|\Psi_2\rangle = (|00\rangle + |11\rangle)/\sqrt{2}$, $|\Psi_3\rangle = (|01\rangle + |10\rangle)/\sqrt{2}$, $|\Psi_4\rangle = (|01\rangle - |10\rangle)/\sqrt{2}$. By performing X-basis measurement on the control qubit at the first communication node and the second communication node simultaneously, the two communication nodes generate different distributed entangled photon states $\rho_{AB}^Q$ with different probabilities, as shown below:

$$\rho_{AB}^Q = \begin{cases} \dfrac{(A_1^2 + B_1^2 + C_1^2)\Psi_1 + 2A_1 B_1 \Psi_2 + 2A_1 C_1 \Psi_3 + 2B_1 C_1 \Psi_4}{(1-D_1)^2}, & (1-pq)^2 \\ \dfrac{A_1 D_1 \Psi_4 + B_1 D_1 \Psi_3 + C_1 D_1 \Psi_2}{D_1(1-D_1)}, & pq(1-pq) \\ \dfrac{A_1 D_1 \Psi_4 + B_1 D_1 \Psi_3 + C_1 D_1 \Psi_2}{D_1(1-D_1)}, & pq(1-pq) \\ \Psi_1, & p^2 q^2 \end{cases}$$

It is obvious that the generation probability of the distributed entangled photon states depends on the selection of measurement basis on control qubits. In addition, when a quantum channel contains qubit flip noise and quantum phase flip noise, the distribution of a polarization entanglement photon source through quantum trajectory may prevent an initial EPR entanglement pair from the interference of the noise environment with a probability $p^2 q^2$ which cannot be achieved by the entanglement distribution under classical trajectory. However, after the measurement of control qubits of the global state $\rho_{\varepsilon,\Lambda,|++\rangle}$ in the basis $|+-\rangle_c$ or $|-+\rangle_c$, a collapsed state obtained between the communication nodes does not contain the standard state component $\Psi_1$. In view of the distinguishability of 4 EPR pairs, although the collapsed state is a weighted sum of the other three entangled states ($\Psi_2$, $\Psi_3$, $\Psi_4$), an entangled mixed state containing component $\Psi_1$ can be smoothly obtained by performing a Pauli operation $\sigma_y$ on any one of the two communication nodes. Therefore, the distributed entangled photon state between the first communication node and the second communication node is converted into the following form:

$$\rho_{AB}^Q = \begin{cases} \Psi_1, & p^2q^2 \\ \dfrac{(A_1^2 + B_1^2 + C_1^2)\Psi_1 + 2A_1B_1\Psi_2 + 2A_1C_1\Psi_3 + 2B_1C_1\Psi_4}{(1-D_1)^2}, & (1-pq)^2 \\ \dfrac{A_1D_1\Psi_1 + B_1D_1\Psi_2 + C_1D_1\Psi_3}{D_1(1-D_1)}, & 2pq(1-pq) \end{cases}$$

Intuitively, post-processing operations of the communication nodes are on the basis of the selection of measurement basis on control qubit: that is, when the two nodes select the same measurement basis, no operation is performed; and when the two nodes select opposite measurement bases, one of the communication nodes needs to perform Pauli $\sigma_y$ operation.

Figure 3:
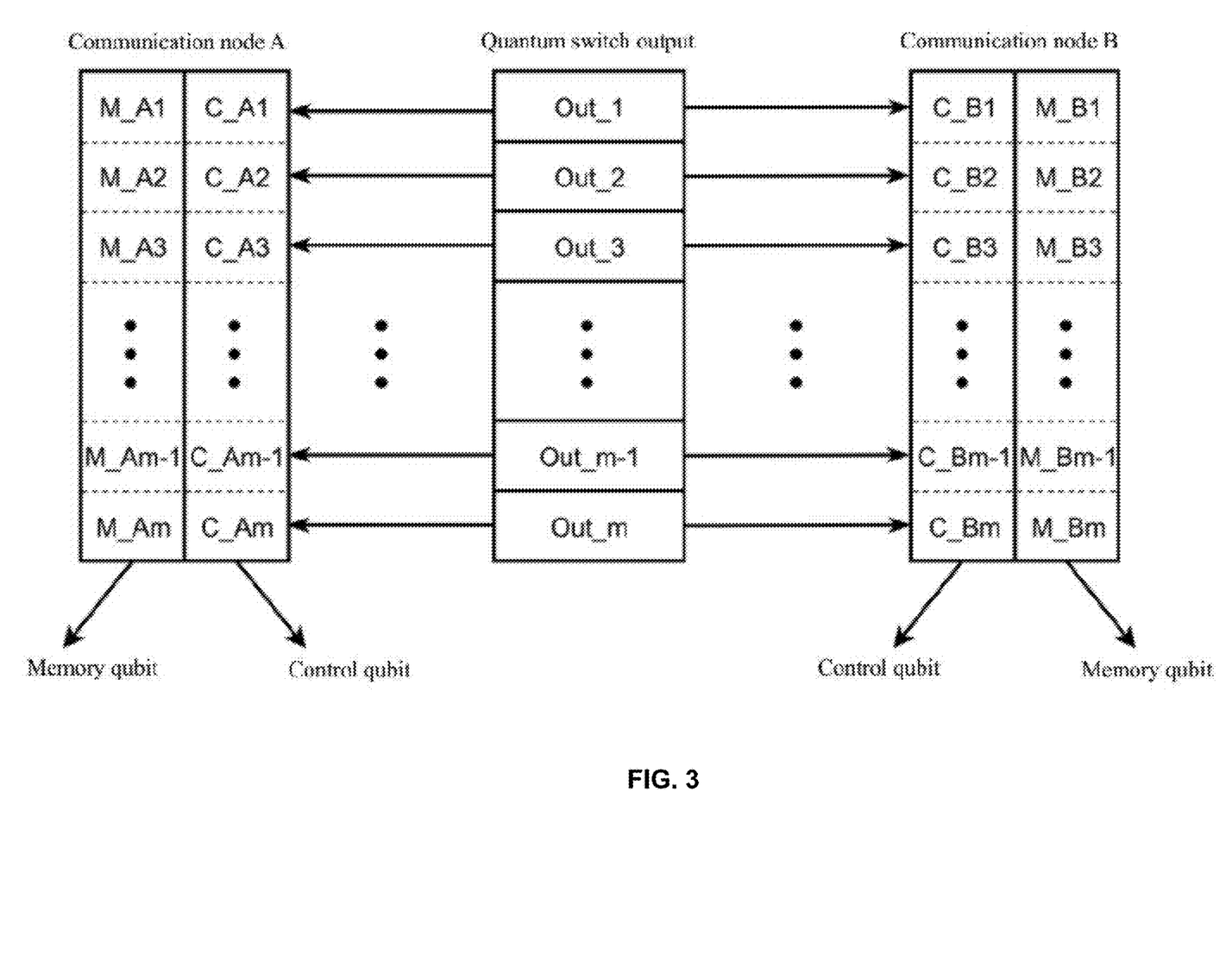
FIG. 3 is a schematic diagram about a storage mode of quantum memory under quantum space-time.

After an elementary entangled link is generated between two communication nodes, entangled particles obtained by two communication nodes need to be stored for subsequent quantum operations. Owing to control qubit controlling the distributed entangled state generated between the communication nodes, it is assumed that after m copies of entangled photon pairs from the entanglement source are persistently distributed through quantum trajectory to two nodes with a time interval τ, as shown in FIG. 3, the first communication node (the second communication node) is required to select the same measurement basis for m control qubits C_Ai (C_Bi), i={1,2, . . . , m}, such that 2m memory qubits (M_Ai, M_Bi) of two adjacent nodes may store m exactly the same distributed entangled states. The specific storage principle is as follows:

(1) two communication nodes first reach a consensus on the selection of measurement basis on control qubit; and a heralded distributed entangled photon state $\rho_{AB}^Q$ can be generated between the two communication nodes once the measurement is completed;

(2) entanglement pairs of a memory qubit and light qubits are respectively prepared in the first communication node and the second communication node in advance; and (3) Bell-basis measurement is performed on the light qubit of entangled photon state $\rho_{AB}^Q$ distributed to the first communication node and the light qubit of the node itself, so as to teleport the first light qubit of the entangled photon state $\rho_{AB}^Q$ to the memory qubit M_A1; similarly, after the second polarized qubit of the entangled photon state $\rho_{AB}^Q$ is teleported, the second polarized qubit is stored in memory qubit M_B1 in the second communication node. Therefore, the storage of the distributed entangled photon state between the communication nodes is implemented.

Figure 4:
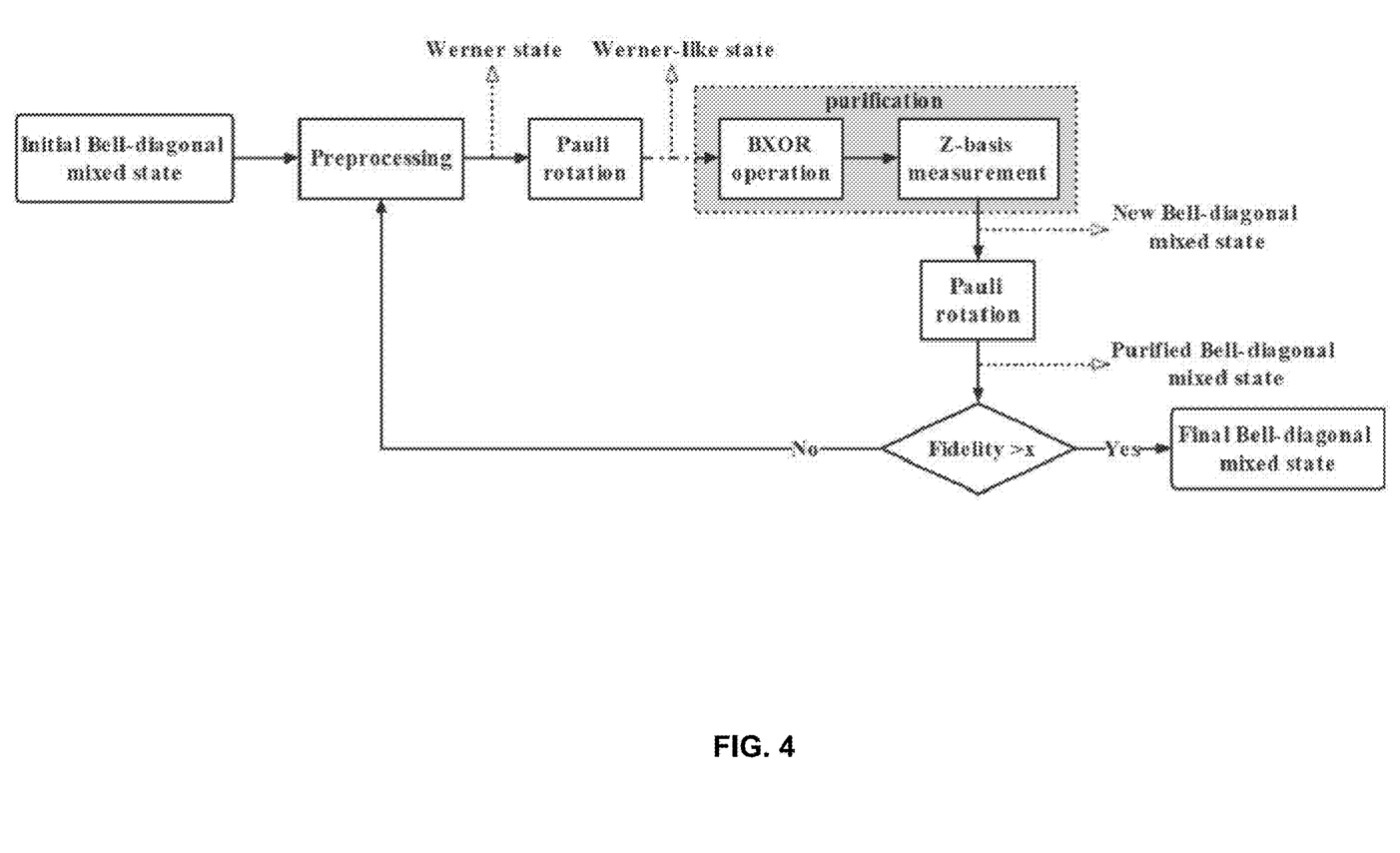
FIG. 4 is a flow chart of an entanglement purification method applicable to any entangled mixed states.

The distributed entangled state generated between the communication nodes under quantum trajectory is probabilistic, which can be an ideal EPR entangled state or an entangled mixed state. Therefore, when measurement basis selected by the two communication nodes on control qubit is not the same |–⟩ basis, an appropriate quantum error correction method is required to improve the fidelity of the entangled mixed state. The quantum information storage model in FIG. 3 may enable all memory qubits of the two communication nodes to store the same entangled state. Therefore, the storage mechanism is utilized to perform entanglement purification operation on the memory qubits to improve the fidelity of the entangled mixed state. Taking the measurement of the control qubits in the bases $|-+\rangle_c / |+-\rangle_c$ as an example, the entangled mixed state generated between two communication nodes are described as $\rho_{AB,other}^Q$, and the operating principle is concreted as follows:

As shown in FIG. 4, an entangled mixed state $\rho_{AB,other}^Q$, in two sets of memory qubits (M_A1, M_B1) and (M_A2, M_B2) is preprocessed, including a unilateral Pauli $\sigma_y$ operation and a bilateral rotation operation through which the entangled mixed state $\rho_{AB,other}^Q$ is converted into a Werner state $W_{AB,other}^Q$:

Although the preprocessing operation may lose amount of entanglement of the entangled state, the complexity of subsequent entanglement purification operation can be reduced.

An entanglement purification operation is performed on the two sets of memory qubits, including: using an EPR entangled state in the memory qubits (M_A1, M_1) as a control state and using an EPR entangled state in the memory qubits (M_A2, M_32) as a target state to perform a bilateral controlled non-gate operation; then, Z-basis measurement is performed on the target state; when the measurement result is 00 or 11, the EPR entangled state in the memory qubits (M_A1, M_13) is retained, otherwise discarded. After all the target states are measured, half of the control states are discarded, and the remaining control states are the result of the first purification of the entangled mixed state $\rho_{AB,other}^Q$. The purified entangled state is stored in the memory qubits (M_A1, M_1).

Figure 5:
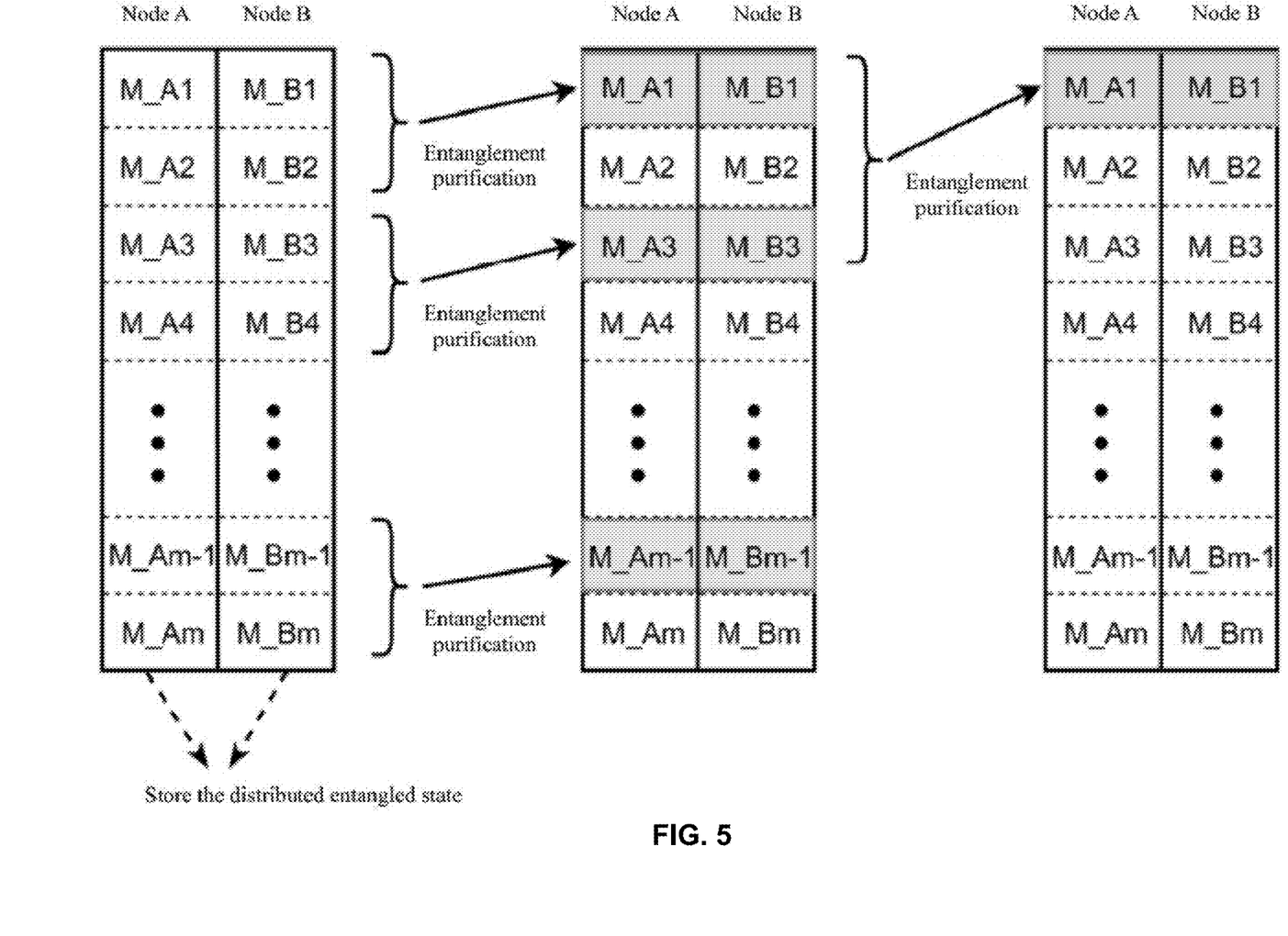
FIG. 5 is a schematic diagram of a method for storing quantum information after entanglement purification is performed by a memory qubit.

If the purified entangled state cannot reach a required threshold, then entanglement purification operation needs to be continuously performed on the entangled state. As shown in FIG. 5, a purified entangled state is stored in the memory qubits (M_A3, M_B3) after the entanglement purification is performed on the two entangled mixed states $\rho_{AB,other}^Q$, each of which is stored in the memory qubits (M_A3, M_B3) and (M_A4, M_34) respectively; then, the entanglement purification operation is performed again on the purified entangled states in the memory qubits (M_A1, M_1) and (M_A3, M_B3), and another new purification result is stored in the memory qubits (M_A1, M_1), so as to complete the secondary purification of $\rho_{AB,other}^Q$.

On the basis of the entanglement purification principle and the storage method of purified quantum information, the desired high-fidelity entangled state can be stored in the memory qubit (M_A1, M_13) through limited times of purification. The above embodiments are merely illustrative of the principles of the invention and its efficacy, and are not intended to limit the invention. Any person skilled in the art may modify or change the above embodiments without violating the spirit and scope of the present invention. Therefore, all equivalent modifications or alterations made by a person with ordinary knowledge in the art, for example, without departing from the spirit and technical ideas revealed by the present invention, shall still be covered by the claims of the present invention.

What is claimed is:

1. An elementary entangled link generation method based on quantum time-space, comprising:

S101, directing, by a communication provider, a laser beam to a nonlinear crystal, thereby enabling probabilistically bursting out of a photon beam, polarizing the photon beam to be in an entangled state, and completing the preparation of a polarized entangled photon pair by the communication provider;

S102, at an entanglement distribution stage, transmitting a first photon of an EPR entanglement source by the communication provider to the first communication node through a quantum trajectory, while transmitting a second photon to the second communication node through a quantum trajectory; by using a quantum switch to simulate each quantum trajectory, the distributed entangled photon state $\rho_{AB}^Q$ between the first communication node and the second communication node is represented in the following form:

$$\rho_{AB}^Q = \begin{cases} \Psi_1, & p^2q^2 \\ \dfrac{(A_1^2+B_1^2+C_1^2)\Psi_1 + 2A_1B_1\Psi_2 + 2A_1C_1\Psi_3 + 2B_1C_1\Psi_4}{(1-D_1)^2}, & (1-pq)^2 \\ \dfrac{A_1D_1\Psi_1 + B_1D_1\Psi_2 + C_1D_1\Psi_3}{D_1(1-D_1)}, & 2pq(1-pq) \end{cases}$$

wherein the given $|\Psi_1\rangle_{AB}$ is the initial polarized entangled photon pair prepared by the communication provider, which is now distributed to the first communication node A and the second communication node B, $$|\Psi_1\rangle_{AB} = \frac{1}{\sqrt{2}}(|00\rangle + |11\rangle)_{AB};$$

$|00\rangle$ and $|11\rangle$ are ground states of two particles, and the ground states of the two particles are uniformly superposed to form a maximum entangled state of the two particles; $A_1=(1-p)(1-q)$, $B_1=(1-p)q$, $C_1=p(1-q)$, $D_1=pq$; $\Psi_i=|\Psi_i\rangle\langle\Psi_i|$, and $|\Psi_2\rangle = (|00\rangle + |11\rangle)/\sqrt{2}$, $|\Psi_3\rangle = (|01\rangle + |10\rangle)/\sqrt{2}$, $|\Psi_4\rangle = (|01\rangle - |10\rangle)/\sqrt{2}$, p, q are respectively error probabilities of a qubit flip channel and a quantum phase flip channel; and S103, after an elementary entangled link is generated between the two communication nodes, owing to the entangled state distributed between two communication nodes determined by control qubit, requiring the first communication node or the second communication node to select the same measurement basis for m control qubits $C_{Ai}$ or $C\_Bi$, i={1,2, . . . , m} when assuming m copies of entangled photon pairs from entanglement source are distributed through quantum trajectories to communication nodes with the time interval T, such that 2m memory qubits (M_Ai, M_Bi) of two adjacent nodes may store m exactly the same distributed entangled states.

2. The elementary entangled link generation method based on quantum time-space according to claim 1, wherein the first communication node or the second communication node is equipped with a flying-matter qubit transducer for converting a photon polarization qubit distributed by an entangled photon source into a memory qubit of the communication node, so as to store and process the entangled state.

3. The elementary entangled link generation method based on quantum time-space according to claim 2, wherein the implementation of the flying-matter qubit transducer comprises that: the first communication node or the second communication node prepares in advance a set of entangled states of light qubits and memory qubits, and the polarization qubit of the entangled photon source can be teleported to the memory qubit of the communication node by performing Bell-basis measurement on itself and the light qubit of the communication node.

4. The elementary entangled link generation method based on quantum time-space according to claim 3, wherein the specific operations of step S103 comprise that: (1) the two communication nodes first reach a consensus on the selection of measurement basis on control qubit; and after the measurement is completed, a heralded distributed entangled photon state ρABQ is generated between the two communication nodes; (2) entanglement pairs of a memory qubit and light qubits are respectively prepared in the first communication node and the second communication node in advance; and (3) Bell-basis measurement is performed on the light qubit of entangled photon state ρABQ distributed to the first communication node and the light qubit of the node itself, so as to teleport the first light qubit of the entangled photon state ρABQ to the memory qubit M_A1; similarly, after the second polarized qubit of the entangled photon state ρABQ is teleported, the second polarized qubit is stored in memory qubit M_B1 in the second communication node; and therefore, the storage of the distributed entangled photon state between the communication nodes is implemented.

5. The elementary entangled link generation method based on quantum time-space according to claim 1, wherein the step of generating a high-fidelity distributed entangled state ρABQ between the communication nodes comprises: preprocessing an entangled mixed state ρABQ in two sets of memory qubits (M_A1,M_B1) and (M_A2,M_B2), including a unilateral Pauli σy operation and a bilateral rotation operation through which the entangled mixed state ρABQ is converted into a Werner state WABQ; performing entanglement purification operation on the two sets of memory qubits, including: using an EPR entangled state in the memory qubits (M_A1,M_B1) as a control state and using an EPR entangled state in the memory qubits (M_A2,M_B2) as a target state to perform a bilateral controlled non-gate operation; then performing Z-basis measurement on the target state; when the measurement result is 00 or 11, retaining the EPR entangled state in the memory qubits (M_A1,M_B1), otherwise discarding the EPR entangled state after all the target states are measured, half of the control states are discarded, and the remaining control states are the result of the first purification of the entangled mixed state ρABQ; and storing the purified entangled state in the memory qubit (M_A1,M_B1); if the purified entangled state cannot reach a required threshold, continuing to perform entanglement purification operation on the first purified entangled state; firstly, performing entanglement purification on the entangled mixed state ρABQ in the two sets of memory qubits (M_A3,M_B3) and (M_A4,M_B4) to achieve a purified entangled state stored in the memory qubit (M_A3,M_B3); then, performing entanglement purification operation again on the entangled mixed state in the memory qubits (M_A1,M_B1) and (M_A3,M_B3), and storing a new purification result in the memory qubit (M_A1,M_B1), so as to complete secondary purification of ρABQ.

\* \* \* \* \*